United States Patent
Roeser et al.

(10) Patent No.: US 11,288,225 B2
(45) Date of Patent: Mar. 29, 2022

(54) ADAPTING TRANSMITTER TRAINING BEHAVIOR BASED UPON ASSUMED IDENTITY OF TRAINING PARTNER

(71) Applicant: Western Digital Technologies, Inc., San Jose, CA (US)

(72) Inventors: Mackenzie Roeser, Rochester, MN (US); Brian Joyce, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/848,700

(22) Filed: Apr. 14, 2020

(65) Prior Publication Data

US 2021/0318979 A1    Oct. 14, 2021

(51) Int. Cl.
*G06F 13/40* (2006.01)
*G06F 13/38* (2006.01)
*G06F 3/06* (2006.01)

(52) U.S. Cl.
CPC ........ *G06F 13/4072* (2013.01); *G06F 3/0607* (2013.01); *G06F 3/0658* (2013.01); *G06F 3/0683* (2013.01); *G06F 13/382* (2013.01)

(58) Field of Classification Search
CPC .. G06F 13/4072; G06F 3/0607; G06F 3/0658; G06F 3/0683; G06F 13/382
See application file for complete search history.

(56) References Cited

U.S. PATENT DOCUMENTS

| | | | |
|---|---|---|---|
| 7,970,087 B2* | 6/2011 | Millman | H04L 7/0334 375/355 |
| 8,000,384 B2 | 8/2011 | Beukema et al. | |
| 8,320,411 B1* | 11/2012 | Sedarat | H04W 52/365 370/503 |
| 8,897,352 B2 | 11/2014 | Cha et al. | |
| 10,148,416 B2 | 12/2018 | Morris et al. | |
| 10,248,591 B2 | 4/2019 | Safranek et al. | |
| 10,331,585 B2 | 6/2019 | Morris et al. | |
| 2005/0134307 A1* | 6/2005 | Stojanovic | H04L 25/4906 326/31 |

(Continued)

FOREIGN PATENT DOCUMENTS

WO    2009003129 A2    12/2008

*Primary Examiner* — Henry Tsai
*Assistant Examiner* — Harry Z Wang
(74) *Attorney, Agent, or Firm* — Patterson & Sheridan, LLP; Steven H. Versteeg

(57) ABSTRACT

The present disclosure generally relates to reducing time for interface transmitter training based upon an assumed identify of the training partner. It is unlikely for a drive PHY to link up with multiple PHYs per power cycle. Therefore, it is a fair assumption that when there is no power loss, the drive PHY is connected to the same host device. The drive can therefore change its behavior based on the assumed identity of the host from previously exchanged identify frames, if the previously used training algorithm was sufficient for interface transmitter training for the particular host. The drive will go directly to the correct training algorithm without the need to do a PHY reset using a training algorithm that is tailored to the host and thus reduce interface transmitter training time.

20 Claims, 6 Drawing Sheets

(56) References Cited

U.S. PATENT DOCUMENTS

| | | | |
|---|---|---|---|
| 2013/0051483 A1* | 2/2013 | Wyatt | H04L 25/03885 375/259 |
| 2014/0281068 A1* | 9/2014 | Das Sharma | G06F 13/4282 710/104 |
| 2020/0162175 A1* | 5/2020 | Kimmitt | H04B 17/336 |
| 2021/0279199 A1 | 9/2021 | Joyce et al. | |

* cited by examiner

ADAPTING TRANSMITTER TRAINING BEHAVIOR BASED UPON ASSUMED IDENTITY OF TRAINING PARTNER

BACKGROUND OF THE DISCLOSURE

Field of the Disclosure

Embodiments of the present disclosure generally relate to reducing time for interface transmitter training based upon an assumed identify of the training partner.

Description of the Related Art

Many high-speed serial interfaces, such as SAS and PCIe, rely on far-end transmitter equalization training schemes to compensate for the signal loss over the longest channels. Because the training relies on detecting analog signal characteristics, the training is vulnerable to noise in pattern, channel, and integrated circuits.

SAS transmitter training, for example, allows a device to send out of band signals during link-up that change the link partner's transmission signal characteristics. Ideally, the transmission signal characteristics would be set to compensate for each particular environment, but the transmission signal characteristics currently do not compensate in such a manner.

When certain undesirable training patterns were discovered previously, special firmware would be written to change how the data storage device participated in transmitter training. The special changes were made on a case by case basis and would only be applicable to the specific device on which the changes were made. The amount of time taken during the training sequences can cause drive detectability issues in certain systems.

Therefore, there is a need in the art for faster interface transmitter training.

SUMMARY OF THE DISCLOSURE

The present disclosure generally relates to reducing time for interface transmitter training based upon an assumed identify of the training partner. It is unlikely for a drive PHY to link up with multiple PHYs per power cycle. Therefore, it is a fair assumption that when there is no power loss, the drive PHY is connected to the same host device. The drive can therefore change its behavior based on the assumed identity of the host from previously exchanged identify frames, if the previously used training algorithm was sufficient for interface transmitter training for the particular host. The drive will go directly to the correct training algorithm without the need to do a PHY reset using a training algorithm that is tailored to the host and thus reduce interface transmitter training time.

In one embodiment, a transmitting device comprises: an interface for connection to a receiving device; and a controller coupled to the interface, the controller is configured to: determine that the transmitting device has previously been connected to the receiving device; and perform interfacing training using the same training algorithm as was used when the transmitting device was previously connected to the receiving device, wherein the interface training is performed without redoing a PHY reset.

In another embodiment, a data storage device comprises: an interface for connection to a host device; and a controller coupled to the interface, the controller is configured to: exchange COMINIT OOB bursts with a receiving device; exchange COMSAS OOB bursts with the receiving device; perform PHY reset using a training algorithm; complete PHY training with the receiving device with a first training algorithm; identify the receiving device; begin subsequent link reset; determine that a power loss event has not occurred; and perform PHY training with the receiving device with the first training algorithm.

In another embodiment, a data storage device comprises: an interface for connection to a host device; means to determine that the data storage device has previously been connected to the host device; and means to skip a default training algorithm for interface training based upon determining that the data storage device has previously been connected to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reducing time for interface transmitter training based upon an assumed identify of the training partner. It is unlikely for a drive PHY to link up with multiple PHYs per power cycle. Therefore, it is a fair assumption that when there is no power loss, the drive PHY is connected to the same host device. The drive can therefore change its behavior based on the assumed identity of the host from previously exchanged identify frames, if the previously used training algorithm was sufficient for interface transmitter training for the particular host. The drive will go directly to the correct training algorithm without the need to do a PHY reset using a training algorithm that is tailored to the host and thus reduce interface transmitter training time.

Figure 1:
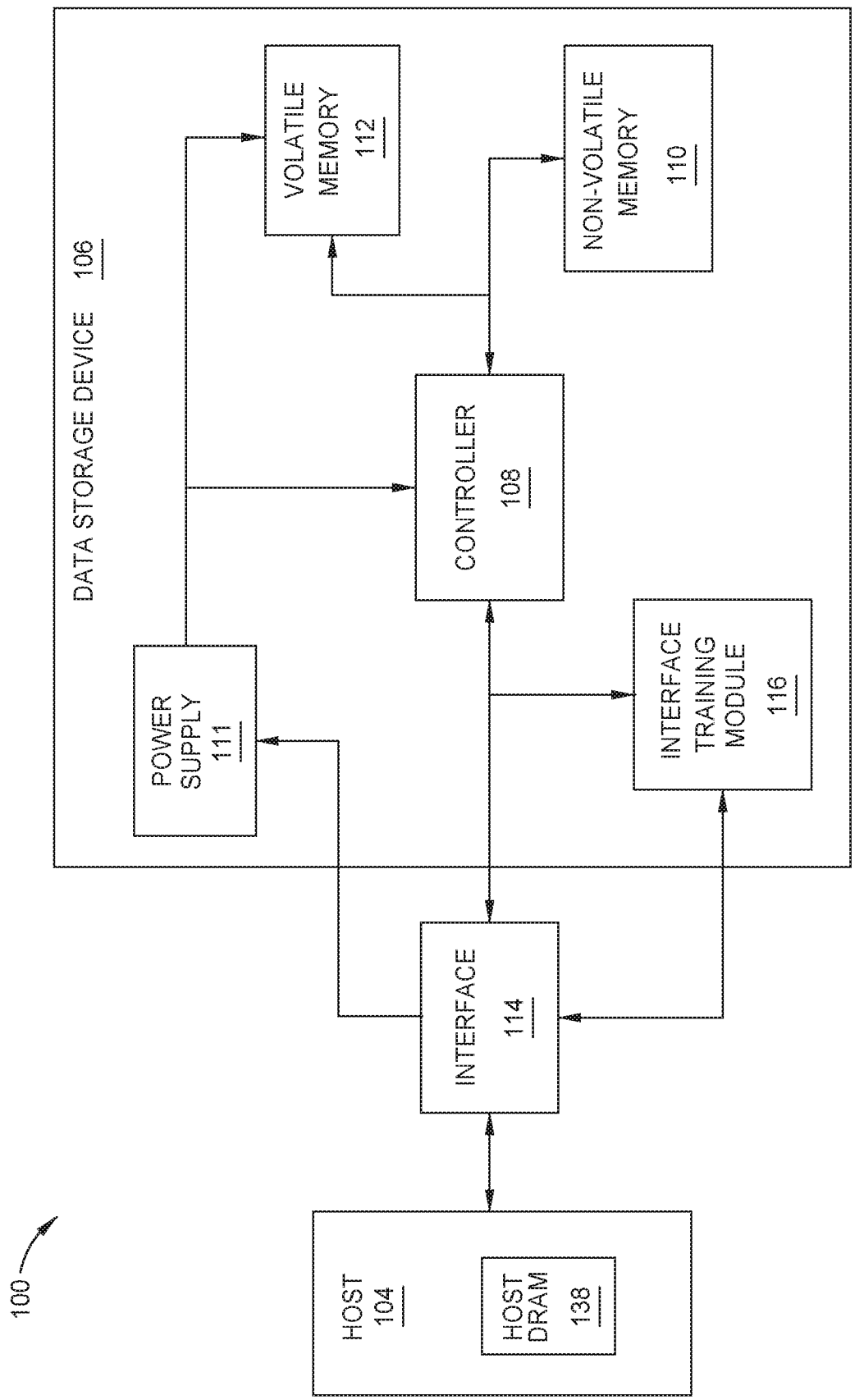
FIG. 1 is a schematic block diagram illustrating a storage system in which storage device may function as a storage device for a host device, in accordance with one or more techniques of this disclosure.

FIG. 1 is a schematic block diagram illustrating a storage system 100 in which a storage device may function as a storage device for a host device, in accordance with one or more techniques of this disclosure. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and an interface training module 116. The controller 108 comprises an internal memory or buffer (not shown). In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with serial attached SCSI (SAS), serial-ATA (SATA), PCI express (PCIe), Universal Serial Bus (USB), 25 Gigabit Ethernet (25 GbE) or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. A backplane of printed circuit board materials such as FR4, or SAS cables, or a combination is also present. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

Furthermore, the interface 114 and the controller 108 may be coupled with an interface training module 116. The interface training module 116 may be firmware and/or hardware designated to determine an optimal input channel of a connection between the host device 104 and the data storage device 106. For example, in a 3 by 3 array, where each point is an input channel, 5 points out of the 9 points may be considered a good connection, whereas the remaining 4 points of the 9 points may be considered a bad connection. Furthermore, as will be discussed in more detail below, the interface training module 116 may utilize a filtering algorithm to only execute requests from the training partner of the device if that request has been made a set number of times in a row. The filtering algorithm may be denoted as "training" herein. Furthermore, the set number of times in a row is a threshold value or a predetermined number of identical requests. The previous example is not intended to be limiting, but to provide an example of a possible embodiment. The interface training module 116 may comprise of firmware that allows for better selection of an input channel.

The data storage device 106 includes NVM 110, which may include a plurality of memory devices or memory units. NVM 110 may be configured to store and/or retrieve data. For instance, a memory unit of NVM 110 may receive data and a command from the controller 108 that instructs the memory unit to store the data. Similarly, the memory unit of NVM 110 may receive a command from the controller 108 that instructs the memory unit to retrieve data. In some examples, each of the memory units may be referred to as a die. In some examples, a single physical chip includes a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which provides power to one or more components of the data storage device 106. When operating in a standard mode, the power supply 111 provides power to the one or more components using power provided by an external device, such as the host device 104. For instance, the power supply 111 provides power to the one or more components using power received from the host device 104 via the interface 114. In some examples, the power supply 111 includes one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
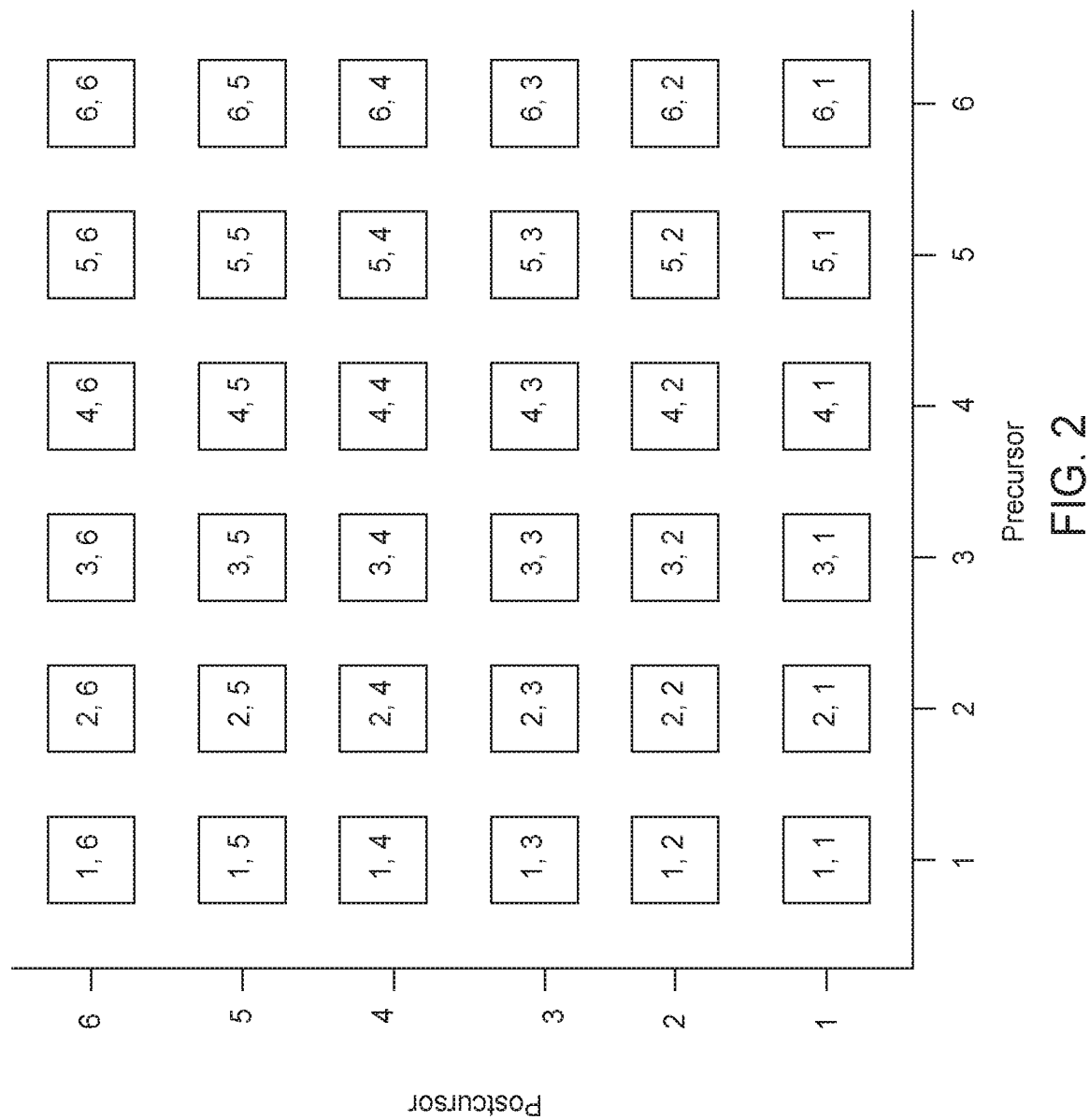
FIG. 2 is a schematic illustration of a transmitting connection grid, according to one embodiment.

FIG. 2 is a schematic illustration of a transmitting connection grid, according to one embodiment. The grid in FIG. 2 illustrates a 6 by 6 array, in which 36 connection points or input channels exists. However, the array of the transmitting connection grid is not intended to be limiting, but to provide an example of a possible embodiment. The x-axis position and the y-axis position designates each point. For example, point (3,4) is the intersection of x-axis equals 3 and y-axis equals 4. Furthermore, the x-axis is considered the precursor tap or C1 tap and the y-axis is considered the postcursor tap or C3 tap. The main tap is implicitly defined to maintain constant amplitude. In addition, two state machines may run in parallel, one for the C1 tap, denoted as precursor tap, and one for the C3 tap, denoted by the postcursor tap, where requests to the C2 tap are ignored since the main tap is implicitly defined.

For an array sized "x" by "y", a number "n" of good connection points or input channels may exist. Furthermore, a number "m" of bad connection points or input channels may exist. The total number of connection points is the sum of "n" and "m". In FIG. 2, "n" number of good connection points or input channels exists and "m" number of bad connection points or input channels exists. In addition, the good and bad connection points or input channels may be randomly scattered throughout the array or clustered together.

When a data storage device, such as the data storage device 106 of FIG. 1, is connected to a host, such as the host device 104 of FIG. 1, via an interface, such as the interface 114 of FIG. 1, the input channel or connection point may be randomly selected or set to a specific point in the array. For example, each time a data storage device 106 is connected to a host device 104, the connection point or input channel in the array is the same point, such as point (1,1), each time the connection occurs. In another example, each time a data storage device 106 is connected to a host device 104, the connection point or input point in the array is randomly selected each time the connection occurs.

Furthermore, each transmission may result in a request to move the connection point or input channel in a more favorable position. An interface training module, such as the interface training module 116 of FIG. 1, may be utilized to determine the optimal connection point or input channel of the transmission. The far-end transmitter equalization training scheme is utilized to compensate for signal loss over long channels. However, if the amount of noise exceeds a certain threshold, the transmitter training requests are more random, which may cause a distribution of transmissions through the entire array instead of a centralizing the transmissions to an optimal position. Because the transmissions are distributed through the entire array, the link quality is degraded and may result in errors and other problems not listed.

However, if the interface training module 116 is allowed to set criteria to filter the transmissions, the overall noise may be reduced. By reducing the noise, the distribution of transmissions in the array may be more centralized to an optimal point. By centralizing the transmissions to an optimal point, the bit error rate and reliability of the serial interface training may be improved.

Within the array, transmission requests affect the position of the input channel or connection point and are bound by the following two criteria: the transmission request may only move one step at a time and the transmission request may only move along the x-axis or the y-axis. The first criteria states that the transmission request may move the input channel or connection point one step at a time. Therefore, any transmission request may move the input channel or connection point to an adjacent point. The second criteria states that the transmission request may move the input channel or connection point along the x-axis (i.e., C1 tap) or the y-axis (i.e., C3 tap). Therefore, any transmission request may move the input channel or connection point horizontally or vertically along the array.

However, the interface training module will not execute a transmission request if the request is to move to a connection point or an input channel that is nonexistent at the edge or boundary of the array. For example, if a transmission request is received to move one step left from an initial connection point or input channel of (1,1), the request will not be executed since the point (0,1) does not exist in the array.

For the following example, the initial connection point or input channel is at point (4,4). Transmission requests to move the input channel or connection point to a new point such as (4,5), (3,4), (4,3), or (5,4) are valid and satisfies the two conditions. It is to be noted that the request to move to a new point, such as (4,5) from an old point, such as (3,4) involves two separate moves. The first move being to either (3,5) or (4,4) and then the second move to (5,4). The connection does not move diagonally in a single move. When the state machine of the controller, such as the controller 108 of FIG. 1, executes a transmission request, the change is also applied to the C2 tap. The relevant state machine associated with the transmission request is reset to the initial state.

Figure 3:
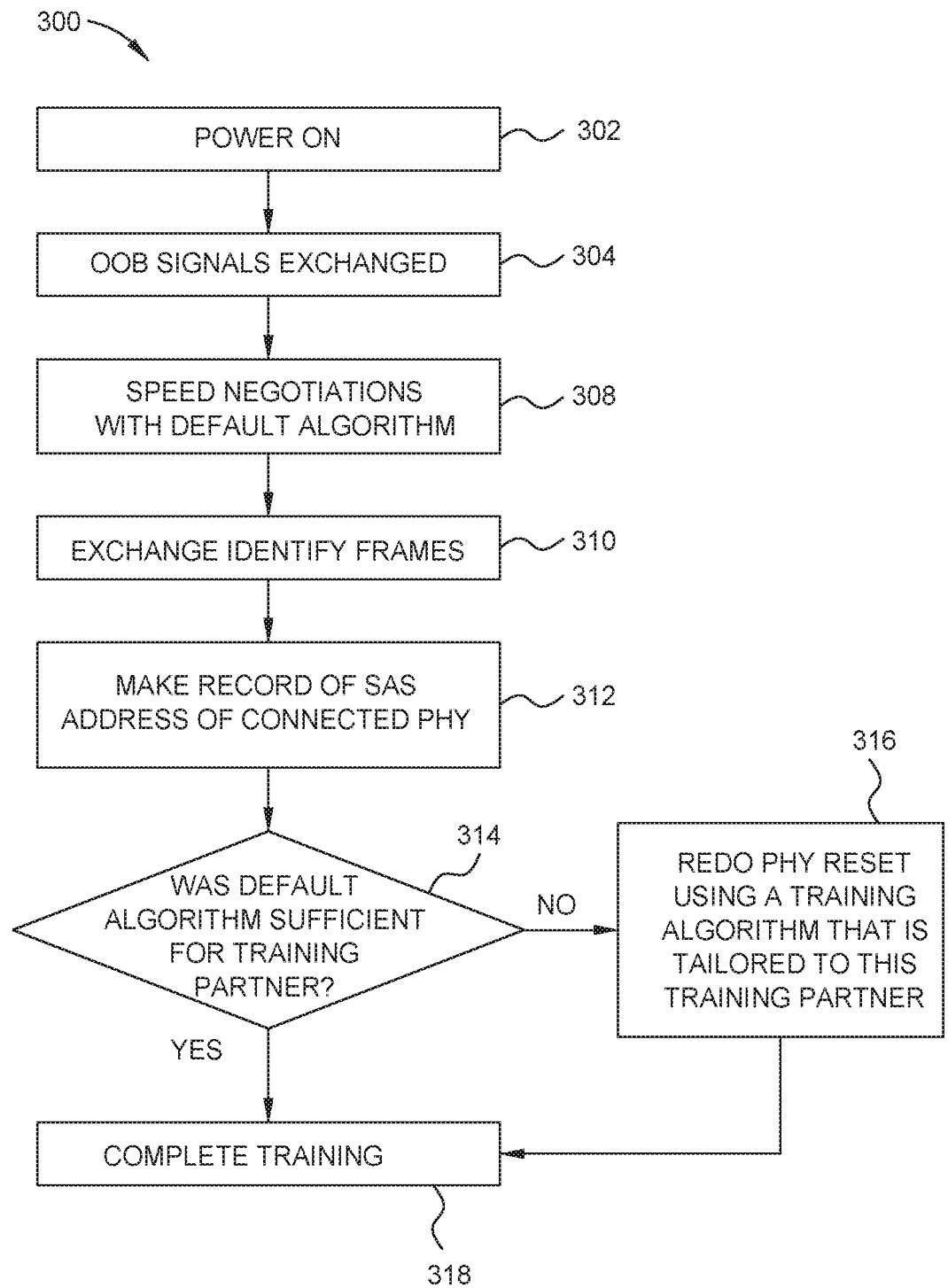
FIG. 3 is a flowchart illustrating a linkup procedure for a first linkup after a power on event according to one embodiment.

FIG. 3 is a flowchart illustrating a linkup procedure 300 for a first linkup after a power on event according to one embodiment. The linkup procedure 300 may be implemented by firmware existing on the data storage device, such as the data storage device 106 of FIG. 1. The data storage device 106 is powered on at block 302. The host, such as the host device 104, may transmit an electrical connection via the connection interface of the data storage device 106, such as the interface 114 of FIG. 1, as discussed in FIG. 1 to power on the data storage device 106.

Out of band (OOB) signals are patterns of idle times and burst times, where the length of the idle time distinguishes between OOB signals. OOB signals are exchanged between the host device 104 and the data storage device 106 at block 304. In one embodiment, the OOB signals may be COMINIT OOB bursts. In another embodiment, the OOB signals may be COMSAS OOB bursts. In still another embodiment, the OOB signals may be both COMINIT OOB bursts and COMSAS OOB bursts, in any order. A COMINIT OOB burst is a set of garbage data sent in bursts by both host device 104 and data storage device 106. Both host device 104 and data storage device 106 may receive the COMINIT OOB burst as a request for communication initialization. The length of the idle time between OOB signals characterizes the OOB bursts. The COMINIT OOB burst idle time may be about 100 µs to about 175 ns to about 525 ns. The previous idle times listed are not intended to be limiting, but to provide an example of a possible embodiment.

A COMSAS OOB burst signifies SAS protocol. After the OOB signal communication at block 304, link training with the default PHY training algorithm begins utilizing the interface training module, such as the interface training module 116 of FIG. 1. The speed of the negotiations with the default PHY training algorithm between the host device 104 and the data storage device 106 is increased at block 308.

After the link PHY training is successful, the host device 104 and the data storage device 106 exchange identify frames at block 310. The identify frame is the first piece of identifying data of the drive PHY that is sent over the link. The controller, such as the controller 108 of FIG. 1, records the SAS address (in the case of SAS protocol) of the connected PHY link at block 312.

The controller 108 determines if the default PHY training algorithm was sufficient for the training partner (i.e., connection to host) utilizing the interface training module 116 at block 314. If the default PHY training algorithm is not sufficient for the training partner, then the controller initiates a PHY reset and utilizes a PHY training algorithm that is better tailored to the training partner at block 316. After the PHY reset and a successful PHY training, the transmitter training is complete at block 318. If the default PHY training algorithm is sufficient for the training partner at block 314, then the transmitter training is complete at block 318.

Figure 4:
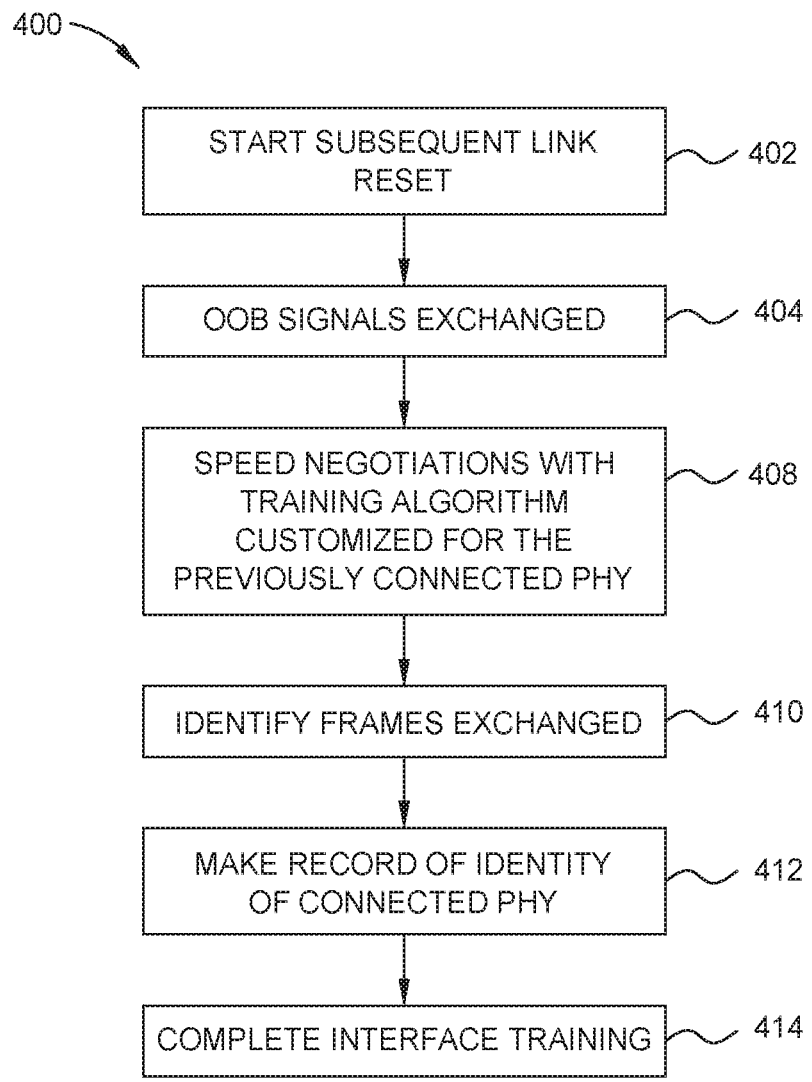
FIG. 4 is a flowchart illustrating a linkup procedure for a subsequent linkup according to one embodiment.

FIG. 4 is a flowchart illustrating a linkup procedure 400 for a subsequent linkup according to one embodiment. The linkup procedure 400 may be implemented by firmware existing on the data storage device, such as the data storage device 106 of FIG. 1. References to storage system 100 may be utilized in the following embodiment, such as a host device referenced may be the host device 104 of FIG. 1 and a storage device referenced may be the data storage device 106 of FIG. 1. Furthermore, certain aspects of the linkup procedure 400 may be similar to the linkup procedure 300. Assuming the training partner of the power on linkup is the same as the training partner of the previous successful linkup, the previous SAS address (when using SAS protocol) of the connected PHY link can be utilized. An embodiment may be that a data storage device 106 is power cycled without removing the data storage device 106 from the host device 104. The previous SAS address (when using SAS protocol) of the connected PHY link is stored by the controller 108 at block 312 of linkup procedure 300, which allows for a subsequent linkup procedure 400. The subsequent linkup procedure may increase the efficiency of the interface training.

At block 404, the OOB signals are exchanged between the host device 104 and the data storage device 106 to initiate a request for communication.

Because the SAS address (in the case of SAS protocol) of the previously connected PHY link is stored by the controller 108, the speed of the negotiations can be increased utilizing the PHY training algorithm customized for the previously connected PHY at block 408. The identity frames are exchanged by both host device 104 and data storage device 106 at block 410. The controller 108 records the SAS address of the connected PHY link at block 412. After successfully recording the SAS address, the interface training is completed at block 414.

Figure 5:
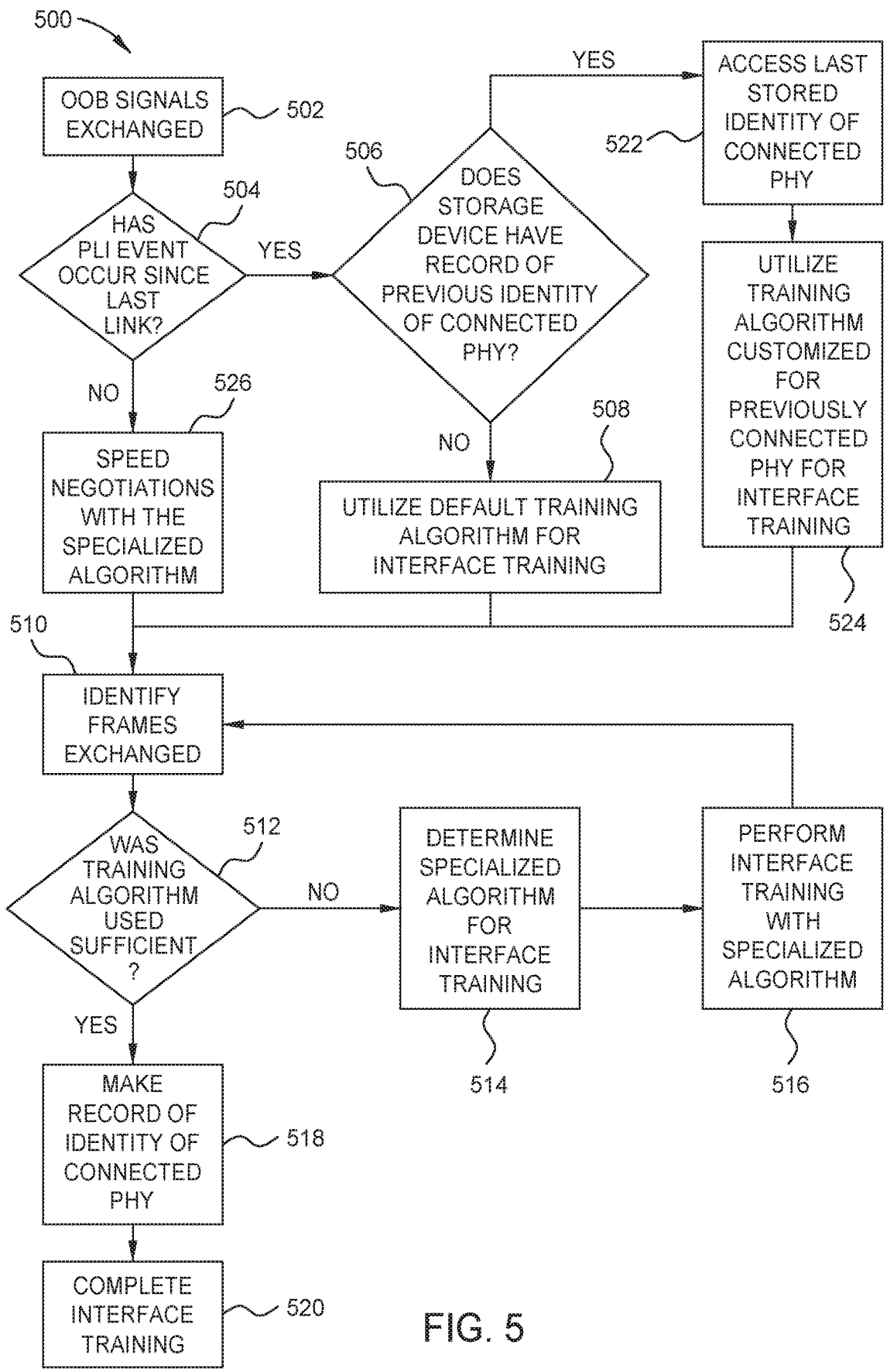
FIG. 5 is a flowchart illustrating a linkup procedure according to another embodiment.

FIG. 5 is a flowchart illustrating a linkup procedure 500 according to another embodiment. The linkup procedure 500 may be implemented by firmware existing on the data storage device, such as the data storage device 106 of FIG. 1. Furthermore, certain aspects of the linkup procedure 500 may be similar to the linkup procedure 300 and the linkup procedure 400. References to storage system 100 may be utilized in the following embodiment, such as a host device referenced may be the host device 104 of FIG. 1 and a storage device referenced may be the data storage device 106 of FIG. 1.

The data storage device 106 may comprise a power loss imminent (PLI) capacitor. The PLI capacitors store energy so that in the case of an unexpected power loss event, data stored in the temporary buffers or the volatile memory 112 of the data storage device 106 can be written to the NVM 110. The linkup procedure 500 relies on the presence of the PLI capacitors in the data storage device 106. Otherwise, the linkup procedure 500 may be required to successfully complete interface training, since the data in the temporary buffers and the volatile memory 112 is flushed after losing power. Furthermore, a PLI event refers to a power loss event in the following embodiment.

At block 502, the OOB signals are exchanged between the host device 104 and the data storage device 106, as described in blocks 304 and 306 of the linkup procedure 300. If the controller 108 detects a PLI event has occurred at block 504, then the controller 108 determines if there is a record of the previous identity of the connected PHY at block 506. The previous identify of the connected PHY may be stored in the NVM 110, interface training module 116, or any hardware configured to store the identify of each connected PHY. Furthermore, the record of the previous identity of the connected PHY may be the record at block 312 of the linkup procedure 300 or the record at block 412 of the linkup procedure 400.

If the data storage device 106 does not have a record of the previous identify of the connected PHY at block 506, then the interface training module 116 utilizes the default training algorithm for interface training at block 508. Thereafter, identify frames are exchanged by the host device and the data storage device in block 510. The controller 108 utilizes the interface training module 116 to determine if the training algorithm used is sufficient for the interface training at block 512. If the training algorithm used is not sufficient at block 512, then the interface training module 116 determines a specialized algorithm for interface training at block 514. The interface training is performed utilizing the specialized algorithm at block 516. Thereafter the identify frames are exchanged in block 510.

If the training algorithm was sufficient at block 512, then the controller 108 utilizes the interface training module to make a record of the identity of the connected PHY at block 518. By successfully creating a record of the identity of the connected PHY at block 518, the interface training is completed at block 520.

However, if the data storage device 106 does have a record of the previous identity of the connected PHY at block 506, then the last stored identity of the connected PHY is accessed at block 522. The interface training module utilizes the training algorithm customized for the previously stored identity of the connected PHY at block 524. After utilizing the corresponding training algorithm for the previously stored identity at block 524, the identify frames are exchanged in block 510. The controller 108 utilizes the interface training module 116 to determine if the training algorithm used is sufficient for the interface training at block 512. If the training algorithm used is not sufficient at block 512, then the interface training module 116 determines a specialized algorithm for interface training at block 514. The interface training is performed utilizing the specialized algorithm at block 516. Thereafter the identify frames are exchanged in block 510.

If the training algorithm was sufficient at block 512, then the controller 108 utilizes the interface training module to make a record of the identity of the connected PHY at block 518. By successfully creating a record of the identity of the connected PHY at block 518, the interface training is completed at block 520.

If a PLI event has not occurred since the last link at block 504, then the speed of the negotiations are increased utilizing the specialized algorithm at block 526. After utilizing the specialized training algorithm at block 526, the identify frames are exchanged at block 510. The exchange of identify frames at block 510 may be similar to the exchange of identify frames at block 310 of the linkup procedure 300 or the exchange of identify frames at block 410 of the linkup procedure 400.

The controller 108 utilizes the interface training module 116 to determine if the training algorithm used is sufficient for the interface training at block 512. If the training algorithm used is not sufficient at block 512, then the interface training module 116 determines a specialized algorithm for interface training at block 514. The interface training is performed utilizing the specialized algorithm at block 516. Thereafter the identify frames are exchanged in block 510.

If the training algorithm was sufficient at block 512, then the controller 108 utilizes the interface training module to make a record of the identity of the connected PHY at block 518. By successfully creating a record of the identity of the connected PHY at block 518, the interface training is completed at block 520.

Figure 6:
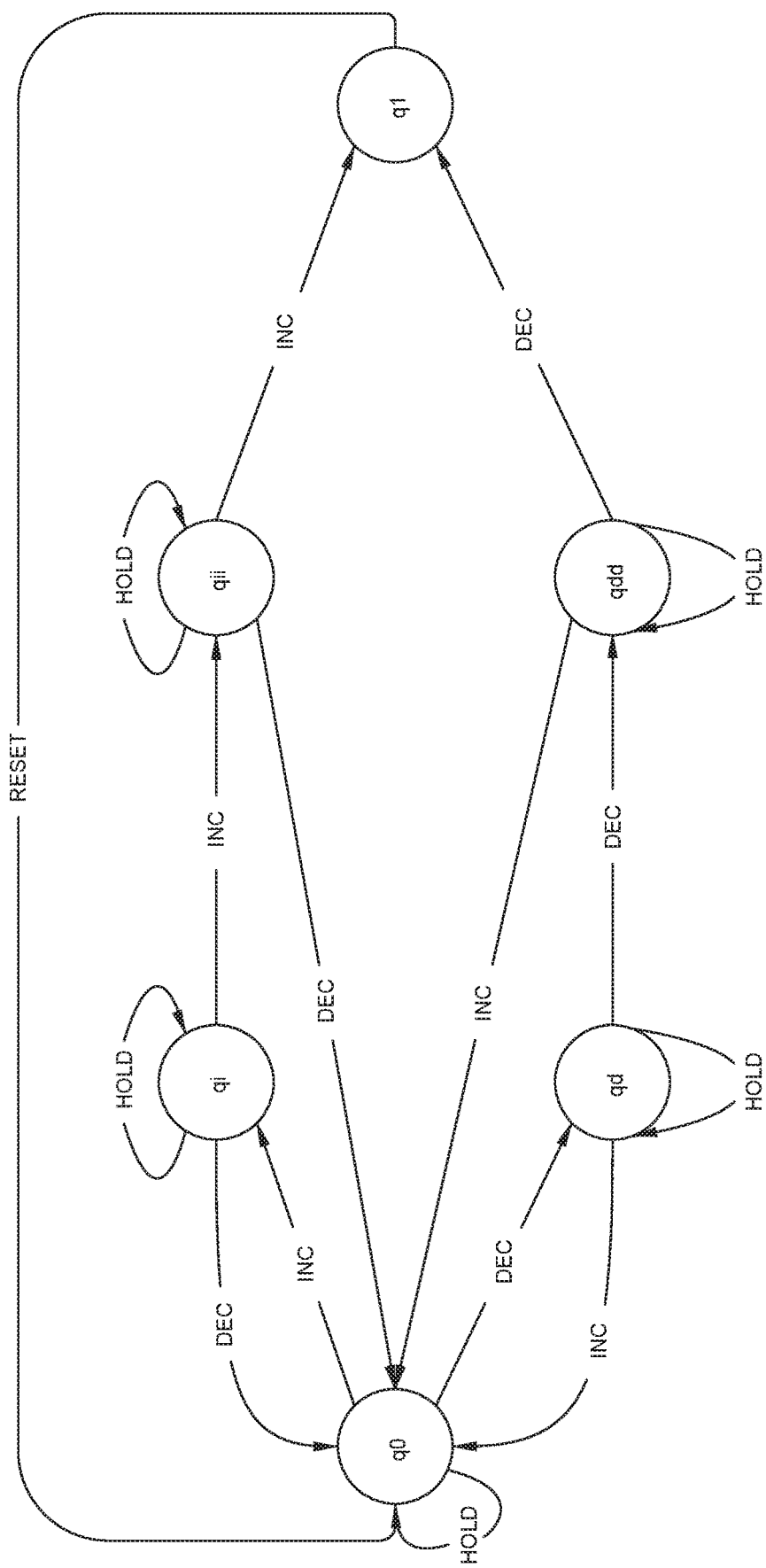
FIG. 6 is a schematic illustration of a training state machine, according to one embodiment.

FIG. 6 is a schematic illustration of a training state machine, according to one embodiment. The training state machine may be the interface training module 116 of FIG. 1. FIG. 2 may be the array of the training state machine of FIG. 6. The training state machine may be one of two state machines in parallel, either a state machine for the C1 tap or a state machine for the C3 tap. C1 tap refers to transmission requests to move an input channel or connection point one step in either horizontal position (i.e., one step left or one step right). C3 tap refers to transmission requests to move an input channel or connection point one step in either vertical position (i.e., one step up or one step down).

Furthermore, the training state machine utilizes a specialized training algorithm, where n=3, to incorporate averaging the transmission requests to better centralize an input channel or a connection point in order to filter out the noise. The specialized training algorithm of the training state machine of FIG. 6 may be the specialized training algorithm referenced at block 316 of the linkup procedure 300, at block 408 of the linkup procedure 400, or at block 520, block 514, block 516, or block 518 of the linkup procedure 500. The letter "n" denotes a threshold value or a predetermined number of identical requests, where "n" is the number of identical requests that the interface training module 116 must receive before executing the transmission request. For example, when n=3, three requests of the same type must be received sequentially before the transmission request is executed. Each previous request before the threshold value is reached is held (i.e., ignored), unless a transmission request that resets the count is received. Requests in the horizontal direction are distinct from requests in the vertical direction. The value of "n" is not intended to be limiting and other values of "n" greater than 1 may be applicable.

Though a larger value of "n" may result in a greater averaging of the transmission requests and a lower noise received, the larger value of "n" may result in a decrease of efficiency of the training. For example, if multiple same transmission requests (i.e., "up", "up", "up") are received to move in the direction of a good input channel or connection point, but a transmission request in the opposite direction is received before the threshold value is reached, the process is interrupted and more than the necessary amount of transmission requests may be needed to reach a good input channel. Therefore, having too large of a value of "n" may decrease the efficiency of the training process. The value of "n" may be set by the transmitting device, such as the data storage device 106 of FIG. 1.

When an opposite request in either direction is received before the threshold value is reached (i.e., n=threshold value), the count resets. For example, the transmission requests are received in the following order of "up", "up", "down", and "up". Though three "up" requests are received, the count is reset when the "down" request is received because a different request in the x-axis was received before the threshold value was reached. The same process occurs in the y-axis direction. In another example, the transmission requests are received in the following order of "up", "up", "left", "up", "left", "down", and "left". The third "up" request and the third "left" request are executed because the requests of the horizontal axis and the vertical axis are independent of each other (i.e., transmission requests referring to C1 tap do not affect transmission requests referring to C3 tap) and the threshold value or predetermined number of identical requests have been received. However, the "down" request is not executed because the threshold has not been reached for the "down" request.

In FIG. 6, the state machine has not received any directional change tap requests at the "q0" state. The directional change tap requests may referred to as transmission requests, herein. The term "q0" may refer to the current position of the input channel or connection point when the data storage device 106 is connected to the host device 104. The current position may be a transmitter initial point, such as point (4,4) of FIG. 2, may be a randomly selected point, which may be point (4,4) or any other point in the array, or may be the point that the last directional change tap location that was executed.

The term "INC" indicates an increase along the x-axis (i.e., x=5 to x=6) or the y-axis (i.e., y=5 to y=6), whereas the term "DEC" indicates a decrease along the x-axis (i.e., x=5 to x=4) or the y-axis (i.e., y=5 to y=4). Furthermore, the term "HOLD" represents a transmission request that is not to the same directional change tap request. For example, if the state machine is for C1 tap or the x-axis and a transmission request associated with a C3 tap or the y-axis is received, then the position in the state machine for the C1 tap or the x-axis does not change and is in a "HOLD" loop. "HOLD" may also represent a request to make no change.

The variable "q" represents the transmission request, where the denotation of a multiple of "i" or "d" refers to an identical transmission request. The variable "i" represents a directional change tap increase request, whereas the variable "d" represents a directional change tap decrease request. Multiple identical transmission requests received in succession, where C1 tap and C3 tap are independent of each other, are denoted by a multiple of the variables "i" and "d". For example, "qii" denotes that two identical directional change tap increase requests were received sequentially. Furthermore, "qdd" denotes that two identical directional change tap decrease requests were received sequentially. The maximum multiple of "i" and "d" can be calculated as follows: Maximum multiple of "i" or "d"=n−1.

When the state machine transitions to the "accept" state, denoted by "q1", the threshold value or the predetermined value of identical requests have been received. If both the threshold value is 3 (i.e., n=3) and three of the identical directional change tap requests have been received sequentially, the interface training module 116 executes the third directional change tap request and also applies the change to the C2 tap. After the directional change tap request is executed, the state machine resets to the "q0" state, denoted by the "RESET" curve.

In the following example, the state machine is for a directional change tap request is along the x-axis (C1 tap). However, the example may be utilized to describe a state machine for a directional change tap request along the y-axis (C3 tap). When the data storage device 106 and the host device 104 are connected via an interface 114, the connection point or input channel may be a preset point in the array or a randomly selected point in the array. The connection point or input channel in the array is point (4,4) of FIG. 2.

Before any transmission requests are received, both state machines for C1 tap and C3 tap are at state "q0". The interface training module 116 receives a first directional change tap increase request in the x-axis. Since the threshold value or predetermined number of identical requests value, n=3, has not been reached, the transmission request is acknowledged, but ignored. However, the corresponding state machine for C1 tap advances from state "q0" to state "qi". A second directional change tap increase request is received in the y-axis. The state "qi" is held in the state machine for C1 tap, while the state machine for C3 tap advances from state "q0" to state "qi". A third directional change tap increase request is received in the x-axis and the request is acknowledged, but ignored because the threshold value has not been reached. The corresponding state machine for C1 tap advances from state "qi" to state "qii".

A fourth directional change tap decrease request is received in the x-axis. Since a different request in the x-axis or C1 tap was issued, state of the state machine for C1 tap resets from state "qii" to state "q0". However, if the fourth directional change tap request corresponded to an increase, then the state machine advances from state "qii" to "q1". The directional change tap increase request is executed since the request satisfies the criteria of a threshold value or a predetermined number of identical requests. The new input channel or connection point is point (5,4) of FIG. 2.

By identifying the host device as the same device prior to redoing a PHY reset, interface transmitter training timing can be reduced.

In one embodiment, a transmitting device comprises: an interface for connection to a receiving device; and a controller coupled to the interface, the controller is configured to: determine that the transmitting device has previously been connected to the receiving device; and perform interfacing training using the same training algorithm as was used when the transmitting device was previously connected to the receiving device, wherein the interface training is performed without redoing a PHY reset. The controller is further configured to cause an identification frame of the receiving receive to be stored in memory on the transmitting device. The controller is further configured to determine that no power loss event has occurred prior to the determining.

The controller is further configured to make a record of an identity of a connected PHY of the receiving device. The controller is further configured to compare an identification frame of the receiving device to an identification frame from a previously connected receiving device. The identification frame is identical to the identification frame from the previously connected receiving device. The controller is further configured to cause out of band signals to be exchanged with the receiving device.

In another embodiment, a data storage device comprises: an interface for connection to a host device; and a controller coupled to the interface, the controller is configured to: exchange out of band signals with a receiving device; perform PHY reset using a training algorithm; complete PHY training with the receiving device with a first training algorithm; identify the receiving device; begin subsequent link reset; determine that a power loss event has not occurred; and perform PHY training with the receiving device with the first training algorithm. Prior to determining that a power loss event has not occurred, exchanging out of band signals with the receiving device. The exchanging the out of band signals with the receiving device occurs after the subsequent link reset. Identification frames are exchanged after performing the PHY training. The controller is further configured to make a record of an identity of a connected PHY of the receiving device. The controller is further configured to determine that a default training algorithm is not sufficient for the receiving device prior to performing the PHY reset. The default training algorithm is not used after beginning the subsequent link reset.

In another embodiment, a data storage device comprises: an interface for connection to a host device; means to determine that the data storage device has previously been connected to the host device; and means to skip a default training algorithm for interface training based upon determining that the data storage device has previously been connected to the host device. The data storage device further comprises means to store an identify frame of the host device. The data storage device further comprises means to exchange out of band signals with the host device. The data storage device further comprises means to determine that a training algorithm was not sufficient. The data storage device further comprises means to determine that a power loss event has not occurred since a previous interface training has been completed. The data storage device further comprises means to exchange identify frames with the host device.

While the foregoing is directed to embodiments of the present disclosure, other and further embodiments of the disclosure may be devised without departing from the basic scope thereof, and the scope thereof is determined by the claims that follow.

What is claimed is:

1. A transmitting device, comprising:
   an interface for connection to a receiving device comprising a transmitting connection grid of connection points to the receiving device; and
   a controller coupled to the interface, the controller is configured to:
   exchange out of band (OOB) signals between the transmitting device and receiving device;
   train a connection between the transmitting device and the receiving device with a first training algorithm to use a first connection point of the transmitting connection grid;
   train the connection with a second training algorithm comprising at least two transmission requests to move the first connection point in the transmitting connection grid to a second connection point; and
   filter the at least two transmission requests to move the first connection point with a state machine configured to move the first connection point to the second connection point after receiving two or more transmission requests to move the first connection point in the same direction on the transmitting connection grid, wherein:
   the two or more transmission requests are received independently relative to any other transmission request of the at least two transmission requests;
   the two or more transmission requests are identical;
   the two or more transmission requests comprises a last transmission request and an other transmission request;
   the other transmission request is ignored; and
   the last transmission request is executed.

2. The transmitting device of claim 1, wherein the controller is further configured to cause an identification frame of the receiving device to be stored in memory on the transmitting device.

3. The transmitting device of claim 1, wherein the controller is further configured to determine that no power loss event has occurred prior to the determining.

4. The transmitting device of claim 1, wherein the controller is further configured to make a record of an identity of a connected PHY of the receiving device.

5. The transmitting device of claim 1, wherein the controller is further configured to compare an identification frame of the receiving device to an identification frame from a previously connected receiving device.

6. The transmitting device of claim 5, wherein the identification frame is identical to the identification frame from the previously connected receiving device.

7. The transmitting device of claim 1, wherein the controller is further configured to cause out of band signals to be exchanged with the receiving device.

8. A data storage device, comprising:
   an interface for connection to a host device comprising a transmitting connection grid of connection points to the host device; and
   a controller coupled to the interface, the controller is configured to:
   exchange out of band signals with a receiving device;
   perform PHY reset;
   complete PHY training with the receiving device with a first training algorithm, wherein the first training algorithm comprises identifying a first connection point of the transmitting connection grid;
   identify the receiving device;
   begin subsequent link reset;
   determine that a power loss event has not occurred;
   perform PHY training with the receiving device with a second training algorithm, wherein the second training algorithm comprises identifying a second connection point of the transmitting connection grid;
   transmit a request to move from the first connection point to the second connection point based on the second training algorithm; and
   filter the request to move the first connection point with a state machine configured to move the first connection point to the second connection point after receiving two or more transmission requests to move the first connection point in the same direction on the transmitting connection grid, wherein:

the two or more transmission requests are received independent relative to any other transmission request of the two or more transmission requests;

the two or more transmission requests are identical;

the two or more transmission requests comprises a last transmission request and an other transmission request;

the other transmission request is ignored; and the last transmission request is executed.

9. The data storage device of claim 8, wherein prior to determining that a power loss event has not occurred, exchanging out of band signals with the receiving device.

10. The data storage device of claim 9, wherein the exchanging the out of band signals with the receiving device occurs after the subsequent link reset.

11. The data storage device of claim 8, wherein identification frames are exchanged after performing the PHY training.

12. The data storage device of claim 11, wherein the controller is further configured to make a record of an identity of a connected PHY of the receiving device.

13. The data storage device of claim 8, wherein the controller is further configured to determine that a default training algorithm is not sufficient for the receiving device prior to performing the PHY reset.

14. The data storage device of claim 13, wherein the default training algorithm is not used after beginning the subsequent link reset.

15. A data storage device, comprising:

an interface for connection to a host device comprising a transmitting connection grid of connection points;

means to determine that the data storage device has previously been connected to the host device;

means to train a connection between the host device and the data storage device using a default training algorithm for interface training using a first connection point of the transmitting connection grid;

means to reset the connection between the host device and the data storage device;

means to train the connection using a specialized training algorithm to use a second connection point of the transmitting connection grid; and means to filter requests to move the first connection point with a state machine configured to move the first connection point to the second connection point after receiving two or more transmission requests to move the first connection point in the same direction on the transmitting connection grid, wherein:

the two or more transmission requests are received independently relative to any other transmission request of the two or more transmission requests;

the two or more transmission requests are identical;

the two or more transmission requests comprises a last transmission request and an other transmission request;

the other transmission request is ignored; and the last transmission request is executed.

16. The data storage device of claim 15, further comprising means to store an identify frame of the host device.

17. The data storage device of claim 15, further comprising means to exchange out of band signals with the host device.

18. The data storage device of claim 15, further comprising means to determine that a training algorithm was not sufficient.

19. The data storage device of claim 15, further comprising means to determine that a power loss event has not occurred since a previous interface training has been completed.

20. The data storage device of claim 15, further comprising means to exchange identify frames with the host device.

* * * * *